Figure 1:
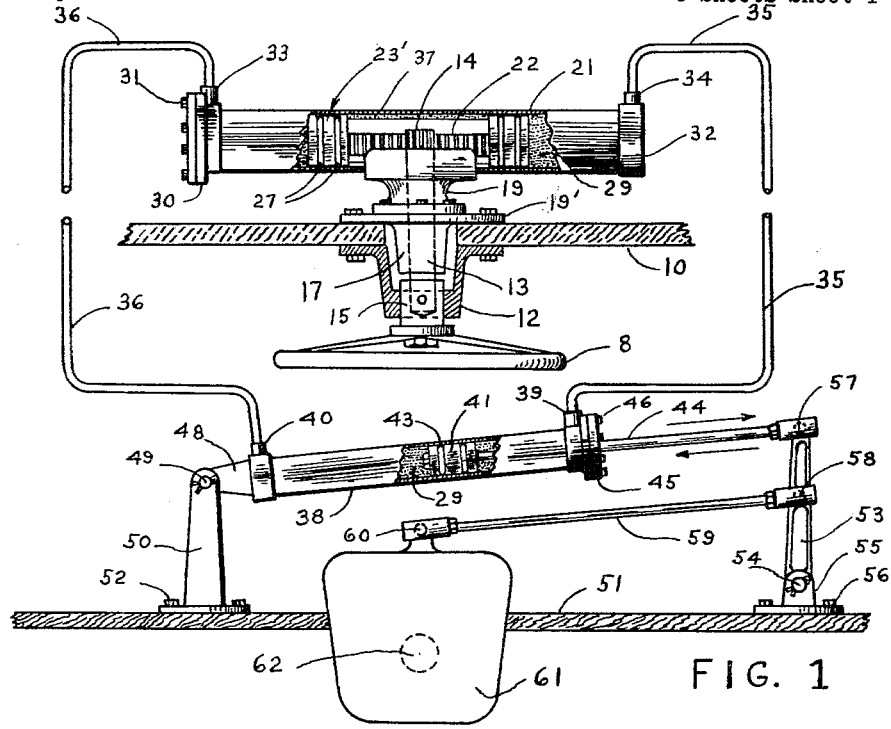

May 4, 1965  E. D. DUNNING  3,181,491

HYDRAULIC BOAT STEERING CONTROL

Filed April 2, 1963  5 Sheets-Sheet 1

INVENTOR.
Elmer D. Dunning
BY
Peter J. Gaylor
Attorney

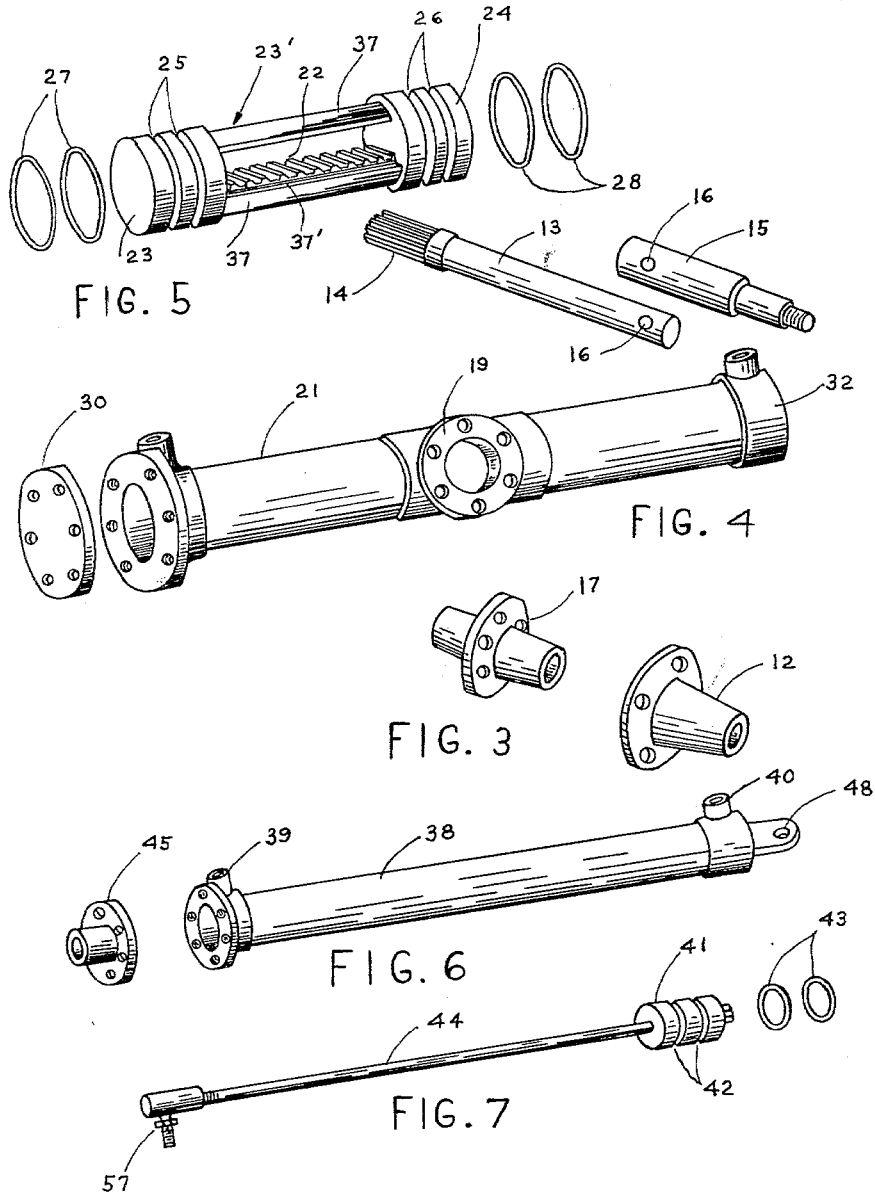

May 4, 1965

E. D. DUNNING 3,181,491

HYDRAULIC BOAT STEERING CONTROL

Filed April 2, 1963

5 Sheets-Sheet 3

INVENTOR.
Elmer D. Dunning
BY
Irving Seidman
ATTORNEY

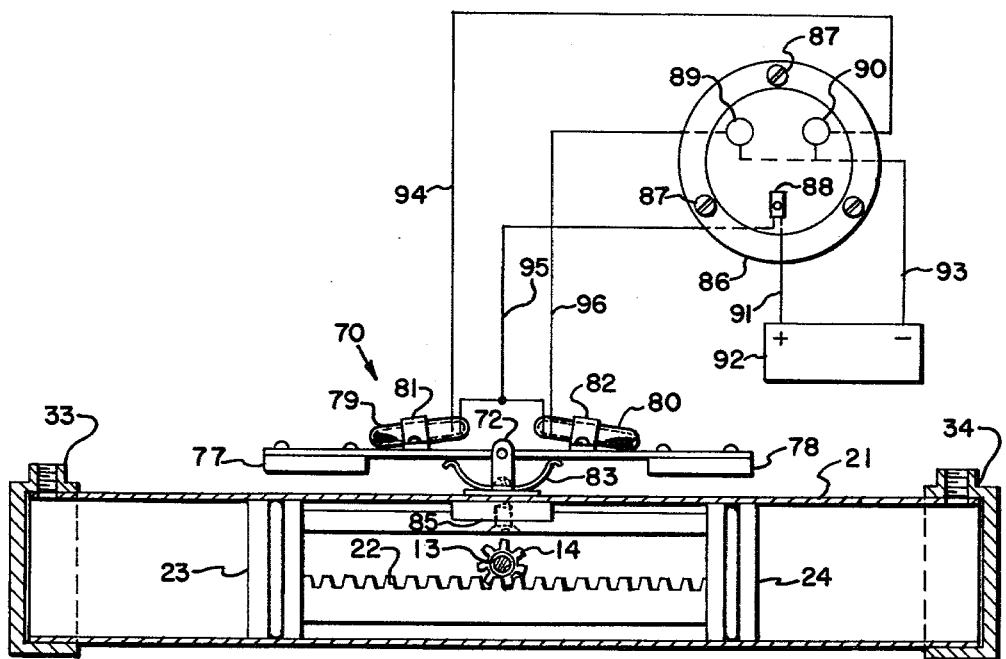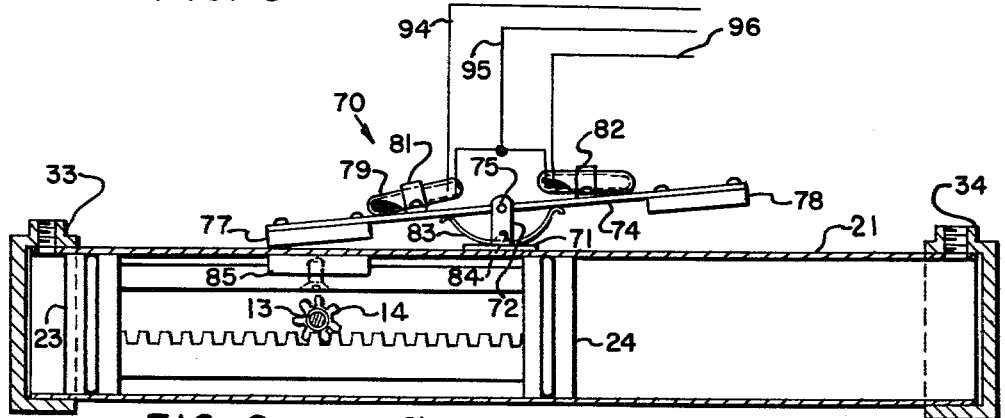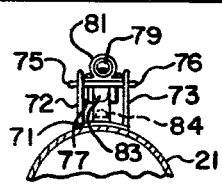

United States Patent Office 3,181,491
Patented May 4, 1965

3,181,491
HYDRAULIC BOAT STEERING CONTROL
Elmer D. Dunning, 231 W. 6th Ave., Roselle, N.J.
Filed Apr. 2, 1963, Ser. No. 270,512
4 Claims. (Cl. 114—150)

This application constitutes a continuation in part of a co-pending application, Serial No. 186,574, filed March 20, 1962, now abandoned.

This invention relates in general to a fluid operated steering system, and more particularly to a hydraulically operated steering system including one or more steering means remotely connected to a direction changing means adapted for use in boats and including indicator means operatively associated with each of the respective steering means and rendered responsive thereto for indicating the setting angle or position of the direction changing means.

Heretofore, numerous kinds of hydraulic steering control systems for use in boats have been proposed. However, many of them had only little or limited success. Most of the known hydraulic type of steering control means utilized a continuously operating pump for maintaining a working pressure on the system. For this reason, such systems were subjected to much difficulty because of the tendency of such systems to develop leaks. Also, the known constructions were relatively complicated and difficult to install in many boats.

Another difficulty encountered in steering systems used in boats is that the pilot thereof had no way of knowing which direction the rudder of the boat was turned. For this reason, it frequently happened that the boat, especially upon initial movement thereof in pulling away from a dock or the like, was likely to be first slammed into the dock, piling or other obstacle in the event the rudder was so turned before the rudder or directional changing means could be righted.

Therefore, an object of this invention is to overcome the above difficulties, by providing a novel fluid operating control or steering system in which a continuous driven pump is not required to maintain a pressure on the system.

Another object is to provide a steering mechanism which is at all times under a balanced pressure so that the directional changing mechanism is rendered instantly responsive to the actuation of a steering means remotely connected thereto.

Still another object is to provide for one or more steering means remotely connected to a common directional changing means in which the latter is rendered responsive to the operation of any one of the respective steering means.

Still another object is to provide the steering means with an indicator for indicating to the pilot the angular disposition or setting of the directional changing means or rudder so that the direction in which the boat will head is known at all times.

Still another object is to provide a hydraulically operated steering control system and an indicating means which is relatively simple in construction, relatively inexpensive to produce, and positive in operation.

In accordance with this invention, the foregoing objects and other features and advantages are attained by a system including one or more steering means, a common directional changing means, and a fluid operated means for remotely connecting each of the respective steering means to the directional changing means whereby the latter is rendered instantly responsive to the operation of any of the former. Each of the steering means includes a steering shaft having a pinion connected to one end thereof operatively associated with a master piston and cylinder assembly in which the piston is displaced by means of a rack disposed in meshing relationship with the pinion. Associated with the directional changing means is a slave piston and cylinder assembly which is pivotally connected at one end about a fixed point. The free end of the slave assembly is connected by means of a piston rod to the directional changing means. Conduit means connect the respective master cylinder to the slave cylinder assembly. If more than one steering means is provided in the system, the respective master cylinders are connected in parallel to the slave assembly.

In order that the boat captain can be appraised at all times of the setting of the directional changing means, an indicating means is operatively associated with the respective steering means. In accordance with this invention, the indicating means is disclosed as being either a pair of signal lights or a visual pointer means, each of which is synchronized to the steering means so as to correspond with the actual setting of the directional changing means.

A feature of this invention resides in the provision of a relatively simple steering mechanism which utilizes a minimum of component parts and which can be readily adapted for use in any type of boat.

Another feature resides in a steering mechanism which can be readily installed into a structure of an existing boat with a minimum of effort.

Another feature resides in the provision of an indicating means which is operatively associated with the steering means for indicating the setting position of the directional changing means or rudder.

Another feature resides in the provision of remotely connecting one or more steering means in a fluid operating circuit to a common direction changing means or rudder whereby the latter means is rendered responsive to the operation of any of the steering means.

Figure 2:
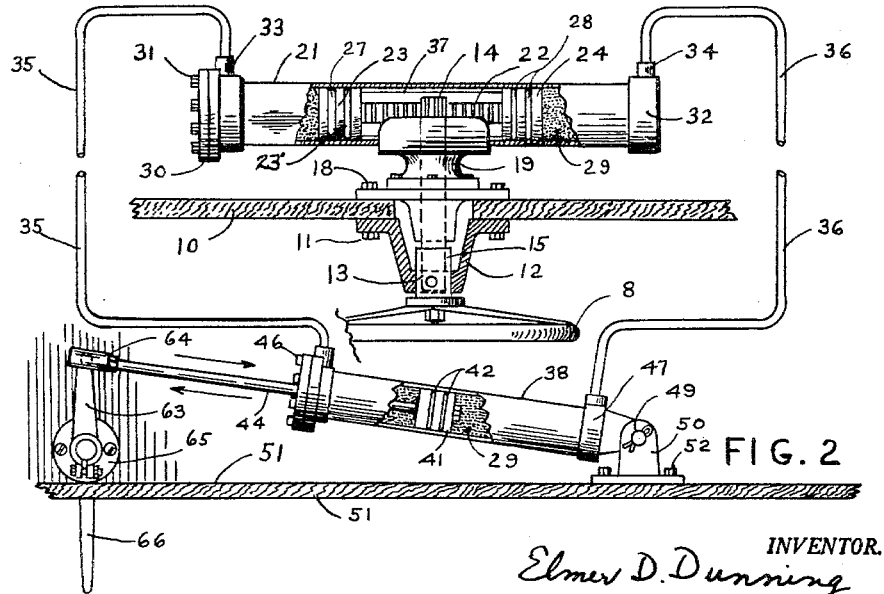
Figure 7A:
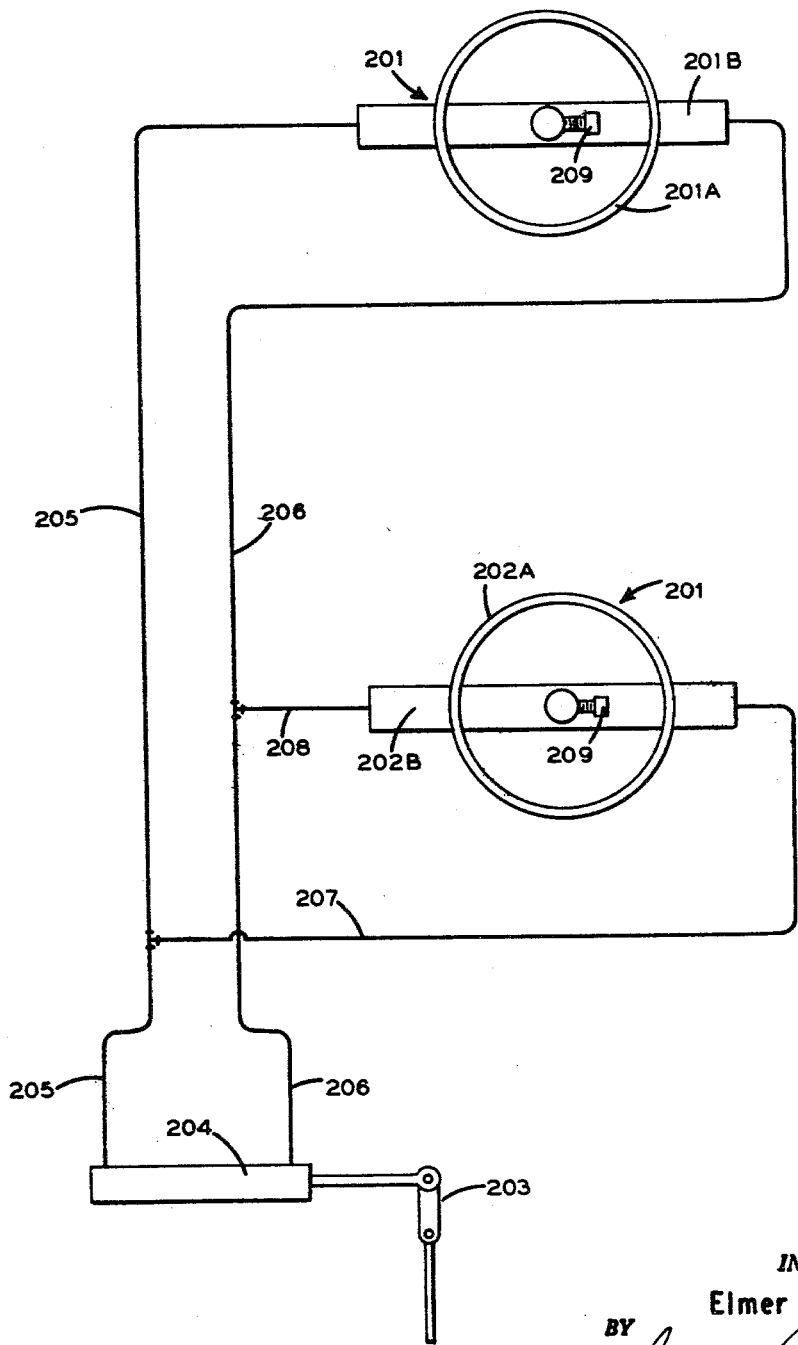
Figure 11:
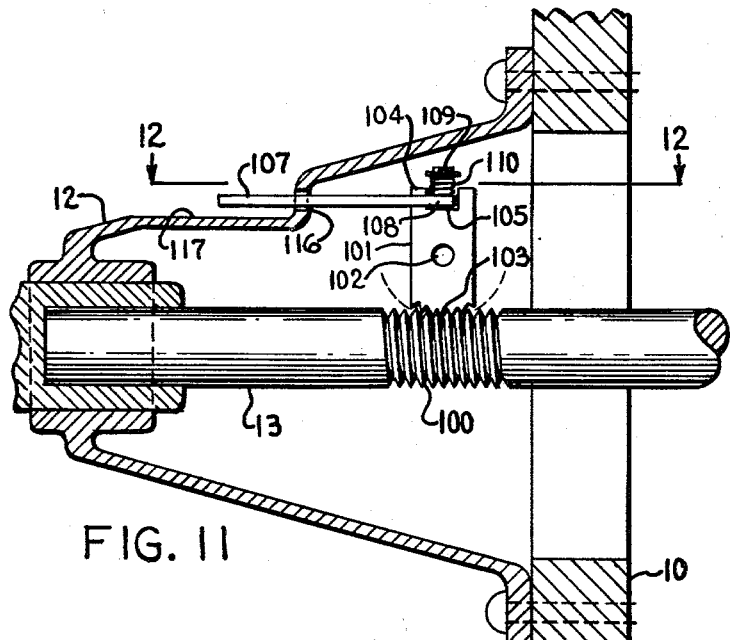
Figure 12:
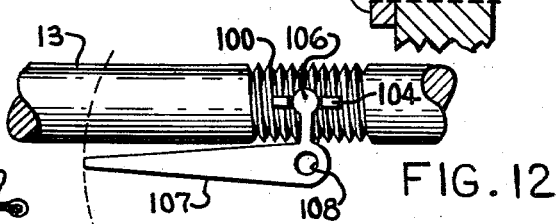
Figure 13:
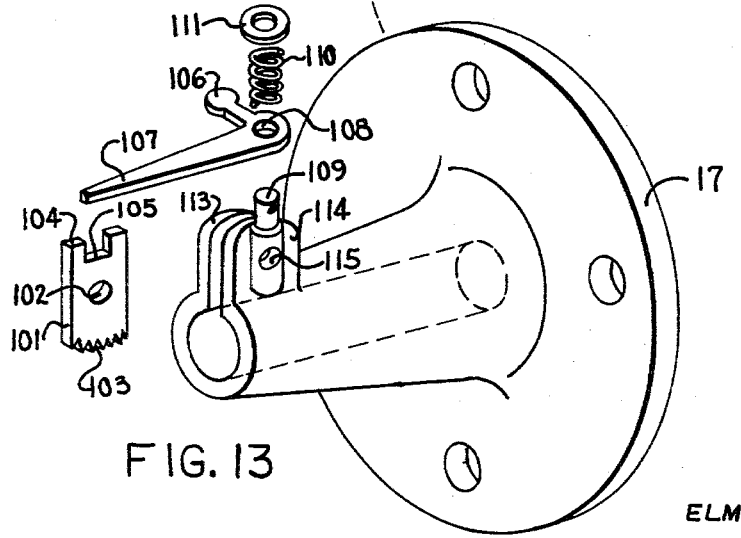

Other features and advantages will become more readily apparent when considered in view of the drawings and description in which FIGURE 1 represents a plan view of the steering system having parts thereof shown in section, and which system is applied to an outboard motorboat. FIGURE 2 is a plan view similar to that of FIGURE 1 but illustrating the application of the steering system of this invention to a rudder controlled boat. FIGURE 3 is a perspective exploded view of the steering drive assembly. FIGURE 4 is a perspective exploded view of the master cylinder assembly. FIGURE 5 represents a perspective exploded view of the piston arrangement of the master piston cylinder assembly of FIGURE 4. FIGURE 6 is a perspective exploded view of the slave piston and cylinder assembly. FIGURE 7 is an exploded view of the piston arrangement of the slave assembly of FIGURE 6. FIGURE 7A is a diagrammatic showing how two steering means are remotely connected in parallel to a directional changing means. FIGURE 8 illustrates a rudder position indicator operatively associated with a slightly modified master steering means assembly in which the indicator is shown in a neutral rudder position. FIGURE 9 is a view similar to that of FIGURE 7 but illustrating the indicator in port rudder position. FIGURE 10 is a sectional view taken along lines 10—10 of FIGURE 9. FIGURE 11 is a side sectional view illustrating a modified indicator construction. FIGURE 12 is a plan sectional view taken along line 12—12 of FIGURE 11. FIGURE 13 is a perspective exploded view of the indicating means of FIGURE 11.

Referring to the drawings, there is shown in FIGURE 1, the fluid operating steering system of this invention as applied to an outboard motorboat. FIGURE 2 illustrates the invention as applied to a boat having a rudder and tiller as its direction changing means.

As shown in FIGURE 1, the fluid operating steering system is illustrated as comprising a steering wheel 8 which is connected to the end of a steering shaft 13. The steering shaft is rotatably journalled in a pair of bearing housing members 12 and 19, respectively. It will be noted that bearing housing 12 is connected to one side of a dashboard 10 and housing 19 is connected to the other side of the dashboard by a flange 19' connected thereto. For ease of assembly, the steering shaft 13 may be made in two pieces which can be joined at 15 and locked together by means of a pin 16. In the illustrated embodiment, a guide housing 17 is attached to flange 19' of the bearing housing member 19 in order to stabilize the shaft 13 at the steering end thereof. Connected to the other end of the steering shaft 13 is a pinion gear 14.

In accordance with this invention a master piston and cylinder assembly 21 is operatively connected with the steering wheel 8 and steering shaft 13 connected thereto. As best seen in FIGURES 4 and 5, the master piston and cylinder assembly comprises a horizontally disposed cylinder member 21 which is provided with a central opening for receiving the pinion 14 connected to the end of the steering shaft 13. One end of the cylinder 21 is sealed off by a plane head 32 which has nipple connection 34 for receiving a flexible conduit 35. The other end of the cylinder 21 is closed by an enclosure plate 30 which is secured to a flange fitting connected to the cylinder 21 by studs 31. Formed in the flange fitting is a nipple 33 to which a flexible hose 36 is connected.

Disposed within the cylinder so as to be slidably displaceable therein is a piston 23'. As seen in FIGURE 5, the piston 23' comprises two spaced apart piston heads 23 and 24 which are connected together by means of spacers 37. One of the spacers 37 which maintains the heads 23, 24 in their spaced apart relationship has a rack 22 mounted thereon. Each of the respective piston heads 23 and 24 is provided with a pair of angular grooves 25 and 26, respectively, which are adapted to receive suitable packing rings, as for example, O-rings 27 and 28. From the construction thus far described, it can be readily apparent that as the steering wheel 8 is turned in one direction or the other, the pinion 14 fixed on the end of the steering shaft 13 will move rack 22 in one direction or the other accordingly. In doing so, the piston 23' connected thereto is displaced within the cylinder, thereby causing the fluid within the cylinder to be forced outwardly through either conduit 35 or 36 depending on the direction in which the steering wheel 8 is rotated.

Operatively connected to the master piston cylinder assembly is a slave piston and cylinder or motion transmitting assembly 38. As seen in FIGURES 6 and 7, the slave piston and cylinder assembly comprises a cylinder member 38 in which there is displaceably mounted a piston head 41. Piston head 41 is also provided with a pair of circumferentially extending grooves 42 which are adapted to receive O-ring packing 43 so as to form a fluid type seal between the piston head and the internal walls of the cylinder 38. Accordingly, the ends of the cylinder 38 are sealed off by cylinder heads 40 and 45. Piston head 41 is connected to a piston rod 44 which projects centrally through the cylinder head 45, which is equipped for a suitable packing to prohibit leakage therethrough. The other sealing head 41 of cylinder 38 is provided with a plate 48 projecting therefrom and which has an aperture formed therein by which it can be readily hinged to a hanger 50. As shown in FIGURE 1, the hanger 50 is attached to the stern end of the boat 51 by means of screw 52. Accordingly, the slave piston and cylinder assembly is pivotally mounted at one end to the hanger plate 50 in a manner which permits the cylinder 58 to swing horizontally about its pivot 49 as may become necessary during the operation of the steering mechanism.

As seen in FIGURE 1, the piston rod 44 is swivelly attached at 57 to the outer end of a support arm 53 which is pivotally mounted at 54 to a hanger 55. The latter, in turn is attached to the stern 51 by means of screws 56. At a point 58, intermediate the ends of arm 53, there is swivelly attached thereto a rudder or thrust rod 59. The other end of the thrust or rudder arm 59 is swivelly connected at 60 to the outboard motor 61 which is mounted to swivel about its vertical pivot 62.

Connecting the respective expandable chambers of the master piston and cylinder assembly to the expandable chambers of the slave piston and cylinder assembly are a pair of conduits 35 and 36. As shown in FIGURE 1, conduit 36 connects the left end of cylinder 21 to the right end of cylinder 38, and conduit 35 connects the right end of master cylinder 21 to the left end of cylinder 38. Therefore, from the foregoing, it will be readily apparent that as piston heads 23 and 24 move to the left in response to a clockwise rotation of the steering wheel 8, hydraulic fluid 29 in the master cylinder 21 is forced through conduit 36 and into cylinder 38. The fluid entering cylinder 38 causes the piston 41 and its attached piston rod to move to the left as shown by the bottom arrow in FIGURE 1. Thus, arm 53 is caused to pivot about 54 in a counterclockwise direction and in doing so, causes the rudder rod 59 connected thereto to be moved to the left. Rod 59 in moving to the left causes the outboard engine 61 connected thereto to rotate in a counterclockwise direction about its pivot 62. Thus, this action causes the boat to be turned to the right, that is, to the starboard side. Turning wheel 8 in the opposite direction would conversely cause the boat to turn to the left or to the port side. Cylinder 38 moves horizontally about its hinge 49 as arm 53 is pivoted to lengthen or shorten the distance of pivot 57 from stern 51.

The construction of the steering mechanism of FIGURE 2 is identical to that described with reference to FIGURE 1 except that the piston rod 44 is swivelly connected at 64 to the end of a tiller 63 which in turn is connected via a bearing housing 65 to a rudder means 66. Thus, it will be seen that when the wheel 8 is turned in a counterclockwise direction, the hydraulic fluid within the cylinder 21 is forced out through conduit 35 and into cylinder 38 causing piston 41 therein to be displaced to the right. As a result the rudder 66 connected thereto by piston rod 44 is rotated clockwise about its pivot. This causes the boat to move to port or left. Accordingly, it will be apaprent that the outboard motor 61 of FIGURE 1 and the rudder and tiller construction of FIGURE 2 are functionally equivalent for the purpose of this invention.

In order that the pilot or captain may be appraised of the direction or setting of the direction change means, i.e. the motor or rudder means of the boat, a novel indicating means is incorporated with the steering mechanism of this invention. FIGURES 8 and 9 illustrate the application of the changing direction means position indicator operatively associated with the master piston and cylinder assembly of the steering arrangement, herein before described. In this arrangement, the cylinder 21 of the master cylinder piston assembly is formed of a non-magnetic material, as for example, brass. In accordance with this form of the invention a non-magnetic plate 71 is mounted on top of the master cylinder 21. Vertical non-magnetic post means 72 and 73, FIGURE 10, are fixed to plate 71 at their bottom ends, and support therebetween a non-magnetic tilt bar 74 at its mid point by means of projecting pegs 75 and 76. Balanced iron plates 77 and 78 are mounted on the under surface of the tilt bar 74 adjacent the ends thereof. Mounted on top of bar 74 adjacent plates 77 and 78 and toward the center of the tilt bar are a pair of mercury switches 79 and 80. These latter switches are attached to bar 74 by means of straps 81 and 82 respectively. A non-magnetic leaf spring 83 is mounted under bar 74 and on plate 71 by a screw means 84. Spring 83 is designed and mounted in a manner such that it impresses a slight thrust on each side of bar 74 so that the tilt bar remains substantially horizontal when equal magnetic effects is impressed upon the iron plates 77 and 78 by a magnet means 85 when the indicator is disposed in neutral position. Accordingly, the bar magnet 85 is centrally mounted on upper spacer 37 which is disposed between pistons 23 and 24 of the master cylinder and piston assembly. Thus, when the steering shaft is turned, the pinion gear 14 which is turned in the same direction and in meshing relationship with rack 22 causes the piston and magnet 85 connected therebetween to be moved accordingly.

Mounted on the dash by means of screws 87 is an indicator signal panel 86 on which are mounted an on-off switch 88, a port light 89, and a starboard light 90. An electrical conduit or wire 91 connects one pole of switch 88 with a battery 92 while electrical conduit 93 connects battery 92 with lights 89 and 90. Conduit 94 in turn connects port or left turn light 89 with one contact of mercury switch 79 and line 95 connects the other pole of switch 88 to the common contacts of mercury switches 79 and 80. Line 96 connects the other contact of mercury switch 80 with right turn light 89. It will thus be noted that when the steering shaft 13 is rotated, the pinion gear 14 meshing with rack 22 connected between piston heads 23 and 24 will cause the same to shift in one direction or the other depending on the direction of rotation of the steering shaft 13; thereby also effecting the displacement of magnet 85 which is connected on the spacer plate 37. When the rack is disposed in its neutral position as shown in FIGURE 8, the affect of magnet 85 on plates 77 and 78 are balanced and therefore spring 83 will maintain the tilt bar 74 in a substantially horizontal or neutral position as shown in FIGURE 8. In this position of the tilt bar, the mercury switches 79 and 80 are open and therefore, lights 89 and 90 are not energized assuming that the master switch 88 is in its on or closed position. It will therefore be apparent that in the event the steering shaft 13 is rotated clockwise to steer the boat to the starboard or right side, the rack and the magnet carried between the piston heads 23 and 24 is shifted to the left as seen in FIGURE 9. In this position, magnet 85 will exert a greater effect on plate 77 causing the same to be attracted to the magnet. When this occurs, it will be noted that the tilt bar 74 is rotated in a counter-clockwise position about its pivot 75. This causes the mercury in switch 80 to connect lines 95 and 96 thereby closing the circuit to the starboard light 90 at which time the same becomes energized and indicates to the pilot that the rudder is in a position for steering the boat to its starboard side. Turning the steering shaft 13 in a counter-clockwise direction will cause light 90 to go out and the port light 89 to go on as the converse movement of the tilt bar occurs.

The rudder position indicator 70 is of particular value when a boat is moored as against a dock, for example. Normally when a pilot enters a boat and starts the engine, he is generally unaware of which direction the rudder is set. Thereby, by merely switching on switch 88, the lights 89 or 90 will immediately signal in which direction the rudder is set. Then all that the pilot needs to do is to turn the steering wheel until both lights 89 or 90 go out. In this position, the captain knows that the rudder is neutralized. Thereafter, he can safely manipulate the rudder as is necessary to get the boat away from the dock without causing unnecessary banging of the same thereinto.

FIGURES 11 to 13 illustrate a modified construction of a rudder signal indicator. In this form of the invention, the steering shaft 13 is required to have a threaded segment 100 disposed intermediate the ends thereof. A suitable thread has been found to be one that has 16 thread per inch. Operatively associated with the threaded section of the steering shaft 13 is a lever arm 101 which is fulcrumed at 102. The lower edge of arm 101 has an arcuate lower end 103 which has formed thereon a series of teeth which are adapted to mesh with threads 100 so that as the shaft 13 is turned, arm 101 is moved either forwardly or backwardly depending upon the direction of rotation of the steering shaft 13. Therefore, it will be noted that the upper end 104 of the arm 101 is moved in an opposite direction.

A slot 105 is formed in the upper end 104 of arm 101. Received in the slot 105 is the rounded end 106 of a pointer lever 107, the latter constituting a bell crank type lever which is pivoted at 108 by a pivot post 109. Pointer 107 is secured to its pivot post 109 by means of a spring 110, a washer 111, and a cotter pin 112. As it will be noted from FIGURE 13, the inner housing 17 is slightly modified to include support lugs 113 and 114 between which lever arm 101 is pivoted. As shown in FIGURE 13, the pivot post 109 for the pointer lever 107 is connected to one side of support 113. It will therefore be apparent that the lever arm 101 is pivotally secured between supports 113 and 114 by means of a pin 102 which passes through holes 115, the free end of the pointer arm 107 thus projects in a horizontal direction through a slot 116 formed in housing 12 which is connected to the inside of the dashboard 10. Cooperatively associated with the pointer 107 is a graduated dial 117 which may be located on housing 12. Thus, with the indicator described, FIGURES 11 to 13, the coaction between pointer 107 and scale 117 not only discloses the direction in which the rudder is setting at any given instant, but also the degree of such setting. From the foregoing, it will be readily noted that when the shaft 13 is turned in one direction or the other, the end 103 of the lever arm 101 moves either forwardly or backwardly depending on the direction of rotation, and that the tilting movement of arm 101 is transmitted to pointer 107. The arrangement is such that when the steering wheel is rotated in a clockwise direction to steer the boat to its right side, the needle pointer 107 will be moved to the right an amount corresponding to the starboard setting of the rudder. Conversely, when the steering wheel is rotated in a counterclockwise direction to steer the boat to its port side, the indicator pointer 107 is moved to the port side a corresponding number of degrees equal to the displacement of the rudder operatively connected thereto.

If desired the invention herein described can be utilized to connect two or more steering stations or wheels 201, 202 to a common directional changing means 203. This is considered to be of particular advantages in boats having for example a flying bridge or the like, and it is desirable that the boat be steered either from the bridge or from within the cabin or cockpit. In such arrangement this instant invention contemplate several steering stations 201, 202 connected to direction changing means so that the latter is rendered responsive to the operation of any of the steering stations. Referring to FIGURE 7A, this is attained by connecting two or more steering stations 201 and 202 in parallel to the direction change means 203 or rudder. It will be noted that each steering station 201, 202 includes a steering wheel means 201A, 202A, and a connected master cylinder assembly 201B, 202B similar to that hereinbefore described with reference to FIGURES 1 and 2. Also the slave piston and cylinder assembly 204 is similar to that herein described. It will be noted that fluid lines 205 and 206 connected the master cylinder 201B with the slave cylinder 204, and that lines 207 and 208 connected the master cylinder 202B of steering stations 202 to lines 205 and 206 respectively. Thus it will be noted that displacement of the piston in either of the master cylinder 201B and 202B will effect displacement of the slave piston accordingly.

If desired, a suitable set screw or locking device 209 is located on the steering shaft bearing housing of each wheel 201A, 202A to serve as a means to lock the respective steering wheel which is not being used. Also it will be noted that a similar set screw may be employed in the embodiments of FIGURES 1 and 2.

While the instant invention has been disclosed with reference to several embodiments thereof, it is to be appreciated that the invention is not to be taken as limited to all of the details thereof as modifications and variations thereof may be made without departing from the spirit or scope of the invention.

I claim:
1. A fluid operating steering mechanism comprising,
   (a) a steering means including a steering shaft, a steering wheel fixed to one end of said shaft and a pinion gear fixed to the other end of said shaft,
   (b) a direction changing means,
   (c) a fluid operated means for remotely interconnecting said steering means to said directional changing means whereby the latter is rendered responsive to the former,
   (d) said fluid operated means including a master piston and cylinder assembly operatively connected to said steering means, and a slave piston and cylinder assembly operatively connected to said direction changing means,
   (e) fluid connection interconnecting said master and slave assembly so that said slave assembly is responsive to said master assembly,
   (f) said master assembly including a master cylinder positioned for receiving said pinion gear,
   (g) a pair of spaced apart displaceable piston mounted in said master cylinder,
   (h) a rack interconnecting said pistons, said rack being disposed in meshing relationship with said pinion gear so that displacement of said piston is effected by rotation of said steering wheel,
   (i) and an indicating means for visually indicating the position of said direction steering means,
   (j) said indication means being connected so as to be rendered responsive to said steering means,
   (k) said steering shaft having a threaded portion intermediate the end thereof,
   (l) a lever arm having an arcuate shaped lower edge portion having teeth formed thereat,
   (m) means for pivotally supporting said lever arm so that the teeth thereof are in meshing relationship with said threaded portion,
   (n) said lever arm having a slot formed in the upper edge thereof,
   (o) a bell crank indicating lever,
   (p) means for pivotally mounting said bell crank lever adjacent said lever arm, and said bell crank lever having one leg thereof connected in said slot in said lever arm, and the other leg thereof functioning as a pointer for indicating the angular position of said rudder means.

2. A steering control and indicator for a boat having a dash, steering means, and a rudder, comprising, in combination,
   (a) a steering shaft connected at one end to a steering means for steering a rudder and terminating at the other end with a rack-moving means,
   (b) a housing attachable to a dash and enclosing said shaft,
   (c) a rack attached in co-acting relation with said rack-moving means and also attached to a rudder-moving means,
   (d) a threaded portion disposed on said shaft within said housing,
   (e) an arm pivoted at the center and disposed over said threaded portion and having teeth on one end fitting the threads on said shaft and thrust means on the other end, and
   (f) a pointer pivoted at its end and having a thrust arm projecting at an angle thereto and having its end connected to the thrust means on said pivoted arm in a manner such that when said shaft is turned, said pivoted arm is moved forwardly or rearwardly and causing said thrust arm and pointer to swing radially on their pivot.

3. A steering control and indicator for a boat having a dash, steering means, and a rudder, comprising, in combination,
   (a) steering shaft connected at one end to a steering means for steering a rudder and terminating at the other end with rack-moving means,
   (b) a first housing attachable to a dash and enclosing said shaft,
   (c) a rack attached in co-acting relation with said rack-moving means and also attached to a rudder-moving means,
   (d) a smaller housing mounted on said dash within said first housing and enclosing said shaft,
   (e) a threaded portion disposed on said shaft within said smaller housing,
   (f) mounting means on said smaller housing disposed over said threaded portion,
   (g) a vertical pivot post projecting upwardly from said mounting means,
   (h) a vertical arm pivoted near its center on said mounting means and having teeth on its bottom fitting the threads on said threaded portion, and thrust means on its top end,
   (i) a horizontal pointer pivoted on its end to said post and designed to swing radially thereon,
   (j) a thrust arm attached to said pointer near its pivot and having its end co-acting in thrust relation to the thrust end of said pivoted arm,
   (k) an opening through said first housing designed to permit said pointer to protrude therethrough,
   (l) and a dial on said first housing under the travel of said pointer for indicating the rudder position via said steering shaft.

4. A steering control and indicator for a boat having a dash, steering means, and a rudder, comprising, in combination,
   (a) a steering shaft connected at one end to a steering means for steering a rudder, a housing attachable to a dash and enclosing said shaft,
   (b) a threaded portion disposed on said shaft within said housing,
   (c) an arm pivoted at the center and disposed over said threaded portion and having teeth on one end fitting said threads on said shaft and thrust means on the other end, and
   (d) a pointer pivoted at its end and having a thrust arm projecting at an angle thereto and having its end connected to the thrust means on said pivoted arm in a manner such that when said shaft is turned, said pivoted arm is moved forwardly or rearwardly and causing said thrust arm and pointer to swing radially on their pivot.

References Cited by the Examiner
UNITED STATES PATENTS

| | | | |
|---|---|---|---|
| 568,736 | 10/96 | Brown | 60—54.5 |
| 912,215 | 2/09 | Warren | 114—154 |
| 2,401,532 | 6/46 | Walker | 114—146 |
| 2,440,987 | 5/48 | Thompson | 200—84 |
| 2,855,755 | 10/58 | Auger | 114—146 |
| 2,891,498 | 6/59 | Schroeder | 114—146 |

MILTON BUCHLER, *Primary Examiner.*
ANDREW H. FARRELL, FERGUS S. MIDDLETON,
*Examiners.*